US005621063A

United States Patent [19]
Wolf et al.

[11] Patent Number: 5,621,063
[45] Date of Patent: Apr. 15, 1997

[54] BLOCKED POLYISOCYANATES AND A PROCESS FOR THEIR PREPARATION

[75] Inventors: Elmar Wolf, Recklinghausen; Christoph Theis, Niederkassel, both of Germany

[73] Assignee: Huels Aktiengesellschaft, Marl, Germany

[21] Appl. No.: 609,924

[22] Filed: Feb. 29, 1996

[30]  Foreign Application Priority Data

May 26, 1995 [DE] Germany ................. 195 19 396.2

[51] Int. Cl.⁶ ............... C08G 18/81; C08G 18/28
[52] U.S. Cl. ............... 528/45; 528/71; 528/73; 528/80; 528/83
[58] Field of Search ............... 528/45, 73, 71, 528/80, 83

[56] References Cited

U.S. PATENT DOCUMENTS

| | | | |
|---|---|---|---|
| 3,882,509 | 5/1975 | Newton et al. | 354/5 |
| 4,007,215 | 2/1977 | Hartmann et al. | |
| 4,098,933 | 7/1978 | Burkhardt et al. | 528/45 |

FOREIGN PATENT DOCUMENTS 2450156  4/1975  Germany .

*Primary Examiner*—James J. Seidleck
*Assistant Examiner*—John M. Cooney, Jr.
*Attorney, Agent, or Firm*—Oblon, Spivak, McClelland, Maier & Neustadt, P.C.

[57] ABSTRACT

(Cyclo)aliphatic polyisocyanates are provided which are completely or partially blocked with malonic esters, the malonic ester containing at least one tert-butyl group. The blocked polyisocyanates may be deblocked at a reduced temperature.

12 Claims, No Drawings

BLOCKED POLYISOCYANATES AND A PROCESS FOR THEIR PREPARATION

BACKGROUND OF THE INVENTION

1. Field of the Invention

The present invention relates to (cyclo)aliphatic polyisocyanates which are partially or completely blocked with specific malonic esters, and to a process for their preparation.

2. Description of the Background

The blocking of aliphatic diisocyanates with malonic esters has been known for a long time. This reaction was first described in D.R.P. 756 058 (1942). The blocking of isophorone diisocyanate (IPDI) with malonic esters is disclosed in DE-A 24 36 872, for example, and the corresponding blocking of the trimeric IPDI in DE-A 30 01 060.

DE-A 24 56 469 describes a process for the preparation of water-soluble or water-dispersible polyisocyanates and their use as coating compositions, the blocked isocyanates being malonic ester-blocked biuretic of hexamethylene diisocyanate.

DE-A 25 50 156 describes capped polyisocyanate mixtures which are readily soluble in paint solvents and which can be formulated in combination with polyester polyols to give one-component PUR stoving enamels. These blocked polyisocyanates are reaction products of trimethylolpropane (1 OH equivalent) and IPDI (2–12 NCO equivalents), whose free NCO groups are blocked with malonic esters, specifically diethyl malonate.

The principal disadvantage of the known malonic ester-blocked polyisocyanates is their relatively high deblocking temperature. Hence, a need exists for malonic ester-blocked polyisocyanates having lower deblocking temperatures.

SUMMARY OF THE INVENTION

Accordingly, the present invention provides malonic ester-blocked polyisocyanates having a reduced deblocking temperature.

The present Invention also provides a process for preparing malonic ester-blocked polyisocyanates having reduced deblocking temperatures.

The above objects and others are provided by (cyclo)aliphatic polyisocyanates which are completely or partially blocked with malonic esters, the polyisocyanates employed being:

A) diisocyanates of the formula:

OCN-R-NCO, in which R is a (cyclo)aliphatic hydrocarbon radical having about 6 to 14 carbon atoms, and B) polyisocyanatoisocyanurates of the formula:

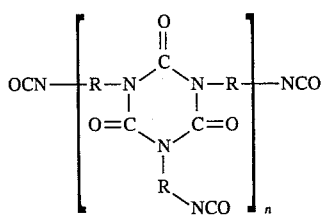

in which n is 1 to 3, R is as defined under A, and the weight ratio of A to B being from (100-0):(0-100), the blocking agents being malonic esters of the formula:

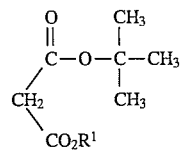

wherein $R^1$ is an alkyl radical having 1 to 10 carbon atoms or the group:

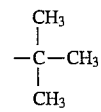

and wherein free NCO groups are present in the reaction product to an extent of not more than 4%.

DETAILED DESCRIPTION OF THE PREFERRED EMBODIMENTS

In accordance with the present invention, it has been surprisingly discovered that the deblocking temperature of malonic ester-blocked polyisocyanates can be lowered by about 10° to 20° C., if the malonic ester used for blocking contains at least one tert-butyl group.

The present invention relates to (cyclo)aliphatic polyisocyanates which are completely or partially blocked with malonic esters, the polyisocyanates employed being A) diisocyantes of the formula:

OCN-R-NCO, in which R is a (cyclo)aliphatic hydrocarbon radical having about 6–14 carbon atoms, and/or B) polyisocyanatoisocyanurates of the formula

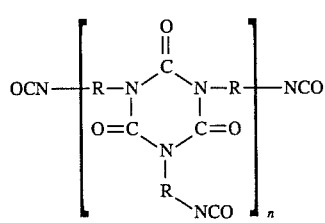

in which n is 1–3, R is as defined under A) above, with the weight ratio of A to B being from (100-0):(0-100), wherein the blocking agents are malonic esters of the formula:

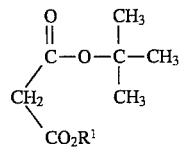

in which $R^1$ is an alkyl radical having 1 to about 10 carbon atoms or a group of the formula:

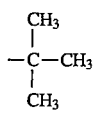

wherein the proportion of free NCO groups in the reaction product is not more than 4%.

The compounds according to the present invention have a blocked NCO content of about 9–16%, a content of isocyanurate groups of 0 to about 7 mmol/g and a free NCO content of 0 to about 4% by weight. They are more reactive, i.e. they cure, in a mixture with the polyol component, at temperatures which are about 10°–20° C. lower than is possible with the corresponding diethyl malonate-blocked polyisocyanates.

The following compounds can be employed, for example, as diisocyanate component A: hexamethylene diisocyanate, 2-methylpentamethylenediisocyanate, 2,2,4(2,4,4)trimethylhexamethylene diisocyanate, cyclohexane 1,3- and 1,4-diisocyanate, isophorone diisocyanate (IPDI), hexahydrodurene diisocyanate, 4, 4'-diisocyanatodicyclohexylmethane and hexahydroxylylene 1,4- and 1,3-diisocyanate or mixtures thereof.

Particular preference is given, however, to the use of isophorone diisocyanate, hexamethylene diisocyanate and 2,2,4(2,4,4)-trimethylhexamethylene diisocyanate or mixture thereof.

Component B can be selected from the isocyanurates of the diisocyanates listed under A, but are preferably the industrially available isocyanurates of IPDI or of hexamethylene diisocyanate.

The ratio of A to B can vary very widely and is within the range from (100-0):(0-100). It is preferred, however, to employ the pure components: either only A or only B.

Malonic eaters which are suitable as blocking agents are methyl tert-butyl malonate, ethyl tert-butyl malonate, propyl tert-butyl malonate, isopropyl tert-butyl malonate, butyl tert-butyl malonate, 2-ethylhexyl tert-butyl malonate and di-tert-butyl malonate.

The present invention additionally relates to a process for the preparation of the compounds according to the invention. In this process, the polyisocyanate—the diisocyanate (component A) and/or the polyisocyanate prepared therefrom which contains isocyanurate groups (component B)—is reacted with the malonic ester, containing at least one tert-butyl ester group, and with a catalyst in the desired NCO:H₂C (active methylene group of the malonic ester) ratio. If a diisocyanate mixture which contains isocyanurate groups is used for blocking (component A and B), then this mixture is generally prepared by a catalytic trimerization of the diisocyanate (component A) in situ; in other words, the diisocyanate (component A) is partially trimerized, using a trimerization catalyst which is not a subject of the present invention, until the desired content of polyisocyanurate (component B) is reached.

It is particularly advantageous to employ for the blocking a virtually diisocyanate-free trimeric diisocyanate (isocyanatoisocyanurate) (component B). The isocyanatoisocyanurate is prepared in two steps, the diisocyanate being reacted to the extent of about 40% with a catalyst generally a quaternary ammonium salt—in the first step. Then, in the second step, the unreacted diisocyanate is removed by thin-film distillation. Suitable trimerization catalysts are those described, for example, in GB-B 13 91 066, DE-C 23 25 826 or DE-C 26 44 684. It has proved particularly advantageous to carry out the trimerization of diisocyanates using the catalysts described in DE-C 29 16 201 (EP 0 017 998). The monomer-free polyisocyanoisocyanurates which are accessible in this way can be employed in the process according to the invention either directly or else in a mixture with isocyanurate-free diisocyanate. The addition of diisocyanate which is free from isocyanurate groups makes it possible in a simple manner to vary the properties of the process products, in particular their viscosity or their melting point, in a desired manner. The NCO component is blocked by reacting about 1–1.3 NCO equivalents of the diisocyanate or polyisocyanatoisocyanurate with 1 mol of malonic ester C) in the presence of about 0.01–1% by weight, preferably about 0.05–0.2% by weight, of a catalyst. As catalysts use is made of alkali metal alcoholates, especially Na methylate, which is commonly used as an approximately 30% strength methanolic solution, and also of zinc acetylacetonate and zinc octoate. The reaction can be carried out at room temperature or at elevated temperatures, for example, about 40°–140° C.

Blocking can be carried out either in bulk or in the presence of suitable solvents. The choice of whether solvents are used or not depends substantially on the subsequent application of the blocked polyisocyanate. If it is used to produce heat-curable PUR powders, it is prepared without solvent. When the compounds according to the invention are employed as curing component for the production of solvent-containing 1-component PUR stoving enamels, their preparation in solution is appropriate. The blocking of the diisocyanate and/or of the isocyanatoisocyanurate prepared therefrom with the malonic ester C) takes place by a procedure in which the malonic ester C) is metered into the diisocyanate and/or the isocyanatoisocyanurate prepared therefrom (which are) heated to approximately about 80°–100° C., if desired in an inert solvent at 0.1% by weight (based on the sum of all components), at a rate such that the temperature of the reaction temperature does not exceed about 120° C. When the addition of malonic ester is complete, the mixture is held at reaction temperature until reaction is virtually complete. In general, 1NCO equivalent of the isocyanate component reacts with 1 mol of malonic ester (C); in some cases it may be more expedient not to react up to 4% of the NCO in the reaction mixture. This is done in particular when the aim is to increase the storage stability and compatibility in the solvent.

The process products according to the invention are suitable as curing component for OH-containing compounds of relatively high functionality. In this way, the process products form a system which cures at above 80° C., preferably 90°–110° C., to give high-quality coatings.

The present invention will now be further described by reference to certain examples which are provided solely for purposes of illustration and are not intended to be limitative.

EXAMPLE 1

222 parts by weight of IPDI and 348 parts by weight of tert-butyl malonate (NNTBE) are charged at room temperature to a reaction vessel. After addition of 0.8 part by weight of NaOCH₃ solution (about 30% strength in methanol), the temperature rises to about 35° C. The mixture is subsequently heated to 80° C, and a further 0.4 part by weight of NaOCH₃ solution is added twice, after 2 hrs. and 4 hrs. After 10 hrs., the NCO content is 0.7%. After cooling and standing (24 hrs., room temperature), the NCO content has fallen to 0.2%. The viscosity of the reaction product is 36,000 mpa.s (at 23° C.); the blocked NCO content is 14.5%.

EXAMPLE 2

194 parts by weight of trimeric hexamethylene diisocyanate (DESNODUR N 3300) having an NCO content of 21.6%, 216 parts by weight of di-tert-butyl malonate and 68.5 parts by weight of SOLVESSO 100/68.5 parts by weight of butyl acetate were heated at 90° C. with 0.55 part by weight of Zn acetylacetonate (about 10 hrs.) until the NCO content had fallen to 0.3%. The viscosity of the reaction product (as a 75% strength solution) is 2500 mpa.s; the blocked NCO content (based on the 75% strength solution) is 7.5%.

EXAMPLE 3

243 parts by weight of trimeric IPDI (VESTARATO T 1890) containing 17.3% NCO, 278 parts by weight of SOLVESSO 100/butyl acetate (weight ratio=1:1) and 174 parts by weight of methyl tert-butyl malonate are reacted with 1 part by weight of zinc acetyl acetonate in a procedure analogous to that of Example 1. The reaction product (as a 60% strength solution) contains 0.4% free NCO. The viscosity of the reaction product (60% strength) is 460 mpa.s; the blocked NCO content is 6.1%.

EXAMPLE 4

111 parts by weight of IPDI, 216 parts by weight of di-tert-butyl malonate and 140 parts by weight of SOLVESSO 100 were reacted with 0.6 part by weight of zinc acetyl acetonate by a procedure analogous to that of Example 3. The reaction product (as a 70% strength solution) contains 0.4% free NCOO. The viscosity of the reaction product (70% strength solution) is 6200 mpa.s; the blocked NCO content is 9.0%.

COMPARATIVE EXAMPLE A 111 parts of IPDI, 160 parts by weight of diethyl malonate and 116 parts by weight of SOLVESSO 100 were reacted with 0.4 part by weight of zinc acetyl acetonate by a procedure analogous to that of Example 3. The reaction product (as a 70% strength solution) contains 0.3% free NCO. The viscosity of the reaction product (70% strength solution) is 5700 mpa.s; the blocked NCO content is 10.6%.

EXAMPLES 5 TO 6 AND COMPARISON EXAMPLE B

Comparing the reactivity of the compounds according to the present invention with that of conventional, prior art compounds:

The compounds from Example 1 (as a 70% strength solution in SOLVESSO 100), Example 4 and Comparison Example A, were mixed with the polycaprolactone CAPA 305 in an NCO:OH ratio of 1:1, applied to Al panels and heated in a convection oven at different temperatures for 15 and 30 minutes. The differences in curing progress are shown by the König pendulum hardness (in seconds) in Table 1.

TABLE 1

| Ex. | | | König hardness | | | | | |
|---|---|---|---|---|---|---|---|---|
| | | | 90° C. | | 100° C. | | 110° C. | |
| No. | Resin | Curing agent | 15' | 30' | 15' | 30' | 15' | 30' |
| 5 | CAPA 305 | IDPI blocked with di-tert-butyl malonate | 25 | 50 | 20 | 110 | 90 | 160 |
| 6 | CAPA 305 | IPDI + 2 methyl tert-butyl malonate | sticks | 10 | 50 | 140 | 100 | 160 |
| B | CAPA 305 | IPDI blocked with diethyl malonate | sticks | sticks | sticks | 60 | 80 | 150 |

Having described the present invention, it will be apparent to the artisan that many changes and modifications may be made without departing from the spirit and the scope of the present invention.

What is claimed as new and desired to be secured by Letters Patent of the United States is:

1. (Cyclo)aliphatic polyisocyanates which are completely or partially blocked with malonic ester and having a reduced deblocking temperature, the polyisocyanates being:

A) diisocyanates of the formula:

OCN-R-NCO, in which R is a (cyclo)aliphatic hydrocarbon radical having about 6 to 14 carbon atoms, and/or B) polyisocyanatoisocyanurates of the formula:

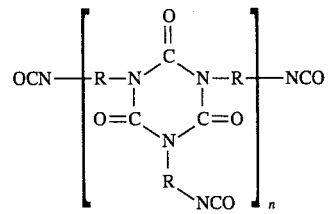

wherein n is 1 to 3, R is as defined under A) above, and the weight ratio of B being from (100-0):(0-100);

said blocking agents being malonic esters of the formula:

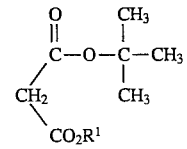

wherein R$^1$ is an alkyl radical having 1 to 10 carbon atoms or the group:

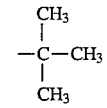

and wherein free NCO groups are present in the reaction product to an extent of not more than 4%.

2. The polyisocyanates of claim 1, wherein the diisocyanates A are selected from the group consisting of isophoronediisocyanate, hexamethylenediisocyanate and 2,4,4(2,2,4)-trimethylhexamethylenediisocyanate.

3. The polyisocyanates of claim 1, wherein the polyisocyanotoisocyanurates (B) are selected from the group consisting of isocyanurates of isophoronediisocyanate and hexamethylenediisocyanate.

4. The polyisocyanates of claim 1, wherein the blocking agents are selected from the group consisting of methyl tert-butyl malonate, ethyl tert-butyl malonate, propyl tert-butyl malonate, isopropyl tert-butyl malonate, butyl tert-butyl malonate, 2-ethylhexyl tert-butyl malonate and di-tert-butyl malonate.

5. The polyisocyanates of claim 1, wherein either a single diisocyanate A) or a single polyisocyanatoisocyanurate B) is used.

6. A process for the preparation of (cyclo)aliphatic polyisocyanates which are completely or partially blocked with malonic ester and having a reduced deblocking temperature, which comprises reacting:

A) diisocyanates of the formula:

OCN-R-NCO, in which R is a (cyclo)aliphatic hydrocarbon radical having about 6 to 14 carbon atoms, and/or B) polyisocyanatoisocyanurates of the formula:

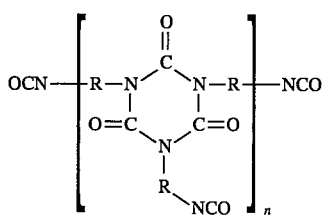

in which n is 1 to 3, R is as defined under A) above, and the weight ratio of A to B is from (100-0):(0-100) or a mixture thereof, with C) blocking agents of the formula:

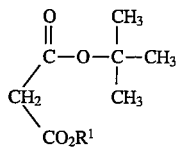

in which $R^1$ is an alkyl radical having 1 to 10 carbon atoms or a group:

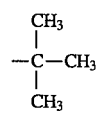

wherein the proportion of free NCO groups in the reaction product is not more than 4%, in the presence of a catalyst.

7. The process of claim 6, wherein mixtures of component A and B are obtained by trimerizing component A in the presence of a trimerization catalyst until the desired content of component B is obtained.

8. The process of claim 6, which is conducted in bulk without solvent.

9. The process of claim 6, which is conducted in a solvent.

10. The process of claim 6, which is conducted in the presence of a catalyst, which is an alkali metal alcoholate.

11. The process of claim 10, wherein said alkali metal alcoholate is selected from the group consisting of sodium methylate, zinc acetyl acetonate and zinc octoate.

12. The process of claim 6, which is carried out at about 40° C. to 140° C.

* * * * *